Dec. 19, 1944. H. F. GODWIN 2,365,338
LAWN MOWER
Original Filed July 19, 1941
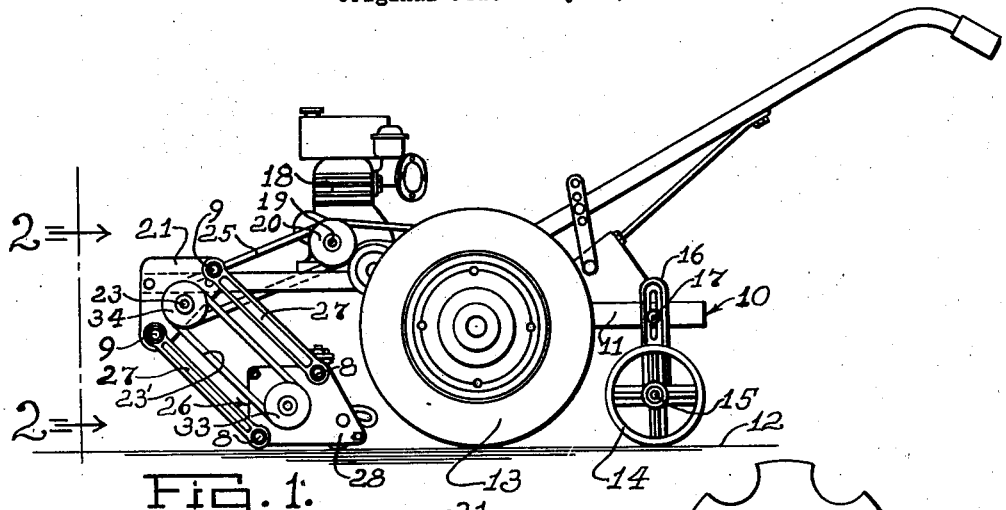
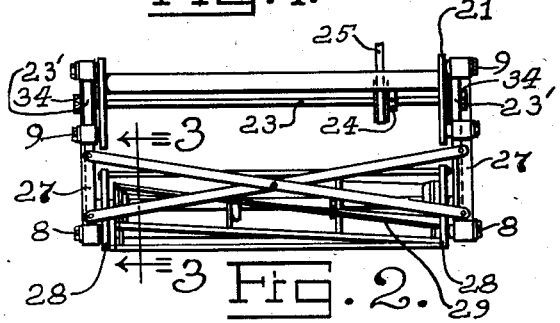
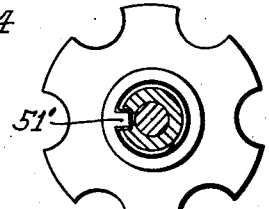
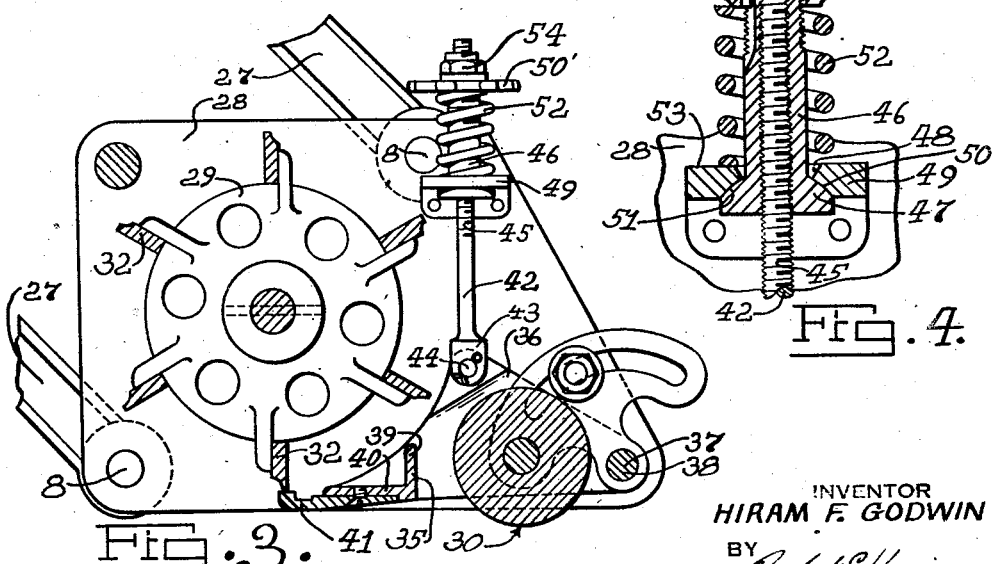
INVENTOR
HIRAM F. GODWIN
BY
ATTORNEY Patented Dec. 19, 1944

2,365,338

UNITED STATES PATENT OFFICE 2,365,338

LAWN MOWER

Hiram F. Godwin, Detroit, Mich.

Original application July 19, 1941, Serial No. 403,113. Divided and this application March 5, 1943, Serial No. 478,068

1 Claim. (Cl. 56—294)

This invention relates to an improved lawn mower and is a division of my copending application Serial No. 403,113, filed July 19, 1941, now Patent Number 2,335,054.

More particularly the invention pertains to the provision in a lawn mower of an improved cutting element adjusting apparatus.

The main objects of the invention are to provide improved mechanism for adjustably controlling the relationship between the knife and cutting reel of a lawn mower; to provide adjustable mechanism of this kind which positively limits the movement of the knife toward the cutting reel and which yieldably urges it toward its limiting position while accommodating resiliently opposed movement of the knife away from the reel in order to guard against injury to the cutting edges of the knife and reel when a stone or other object becomes engaged therebetween; to provide individual adjusting devices for independently and selectively varying the limit of movement of the knife toward the cutting reel and the force resiliently opposing opposite movement thereof, respectively; and to provide mechanism for making either of the foregoing two adjustments without changing the other.

Other objects and advantages of the invention will be more apparent from the following description taken in connection with the accompanying drawing, in which:

Fig. 1 is a side elevational view of a lawn mower embodying the invention.

Fig. 2 is a fragmentary front elevational view showing the cutting unit and its support as viewed from the line 2—2 of Fig. 1.

Fig. 3 is a transverse, vertical sectional view of the cutting unit taken on the line 3—3 of Fig. 2.

Fig. 4 is a vertical sectional view showing in detail the knife adjusting mechanism with which the cutting unit s provided.

Fig. 5 is a horizontal sectional view taken on line 5—5 of Fig. 4.

In the form of the invention illustrated in the drawing my improved lawn mower comprises a main chassis, generally designated by the numeral 10, having a frame member 11 which is supported above the ground level 12 by a pair of relatively large wheels 13 provided with pneumatic tires and smaller trailing wheels 14. The wheels 14 are mounted on an axle 15 which is carried by a pair of vertically shiftable bars 16 each of which is releasably held in a selected position by a nut 17. Mounted on the chassis frame 11 intermediate its ends is a suitable prime mover such as a gasoline motor 18 having a driving shaft 19 provided with a pulley 20.

A triangularly shaped mounting plate 21 is rigidly fixed to each side of the forward extremity of the frame 11 as shown in Figs. 1 and 2. These plates are provided with registering openings in which is journalled a shaft 23 having a pulley 24 mounted thereon at a location between the plates 21. A belt 25 drivingly connects the pulleys 20 and 24.

The cutting unit, designated by the numeral 26, is suspended from the mounting plates 21, in the manner shown in Fig. 1, by a parallelogram drag link mechanism. This mechanism comprises two pairs of links 27, the upper ends of each pair being pivoted at 9 on one of the plates 21 of each side of the frame 11, respectively. The unit 26 comprises a pair of end plates 28 secured in spaced relation by a cutting reel 29 and roller mechanism generally designated by the numeral 30. The reel has a plurality of spiral blades 32 and a central shaft on an external end of which is mounted a pulley 33, which is drivingly connected by a belt 23' to a pulley 34 mounted on an external end of shaft 23 which is in turn driven by the engine 18 through the pulley 20, belt 25 and pulley 24.

The lower ends of each pair of links 27 are pivotally connected at 8 to one of the end plates 28, respectively, of the cutting unit. The links 27 are of substantially equal length and the pivotal axes of their upper ends are spaced apart a distance substantially equal to the spacing of the pivotal axes of their lower ends in order to produce a parallelogram action which maintains the bottom plate of the cutting unit in substantially parallel planes regardless of the position to which the cutting unit is swung during operation. The axis of the shaft 23 is equally spaced from and in the plane defined by the axes of the pivots 9 of the upper ends of the links 27 and the central shaft of the reel 29 is equally spaced from and in the plane defined by the axes of the pivots 8 of the lower ends of the links 27, as illustrated in Fig. 1. The links 27 extend rearwardly and downwardly from the front end portion of the frame 11 in order to propel the cutting unit by a dragging action during forward movement of the mower.

Since the axis of the shaft 23 and the axis of the central shaft of the reel 29 are equal distances from the link pivots 9 and 8, respectively, the axis of the shaft 23 is spaced from the pivot 9 of one link 27 a distance equal to the space between pivot 8 and the axis of the central shaft, for the distance between each pivot 8 is equal to the distance between each pivot 9. The distance between these two shafts, and the pulleys thereon, does not vary throughout the range of swinging movement of the cutting unit 26 for this distance is measured by a line parallel and equal in length to the links 27. By virtue of this structure a single driving element of fixed length, such as the belt 23' may be used to drivingly connect the pulleys 33 and 34.

The cutting unit assembly is provided with a fixed knife bed 35 which comprises a pair of triangularly shaped end plates 36 each of which is pivotally mounted at 37 on a lower corner of one of the end plates 28 of the cutting unit as shown in Fig. 3. The pivotal support for the knife bed may comprise a bolt 38 extending transversely of the unit between the plates 28 thereof. The plates 36 are connected by a web structure 39 having a seat portion 40 on which is detachably mounted a fixed cutting blade 41, the operating edge of which is disposed in adjacent relationship to the spiral blades 32.

The plate 36 and blade 41 carried thereby are adjustably positioned so as to predetermine the relation between the fixed blade and the blades of the reel 29 by apparatus including a pair of vertical stems 42 each stem having a clevis 43 at its lower extremity by which each stem is pivotally attached at 44 to the uppermost corner of a respective triangular plate of the knife bed. The upper end portion of each stem 42 has a threaded section 45 which is threaded into a sleeve 46. The latter has an enlarged radially extending abutment 47 at its lower end portion and it is rotatably received in an aperture 48 formed in a bracket 49 mounted on and extending laterally from an end plate 28 of the cutting unit. The bracket 49 has a fragmentary spherical surface 50 which abuts a corresponding surface 51 formed on the abutment 47 in order to positively, selectively limit upward movement of the stem with respect to the bracket 49. The sleeve 46 can be adjustably positioned longitudinally of the stem 42 by rotating it on its threads by the aid of a thumb adjusting nut 50' which is axially, shiftably mounted on the sleeve 46 and non-rotatably held with respect thereto by a spline 51' on the nut which is engaged in a groove 52' formed in the sleeve 46. Rotation of the nut 50' causes rotation of the sleeve 46 which results in shifting the sleeve axially with respect to the stem 42.

The knife bed 35 and blade 41 carried thereby are yieldably urged upward toward the limiting position established by the surfaces 50, 51 by a coil spring 52 which surrounds the sleeve 46 and which bears between the upper surface 53 of bracket 49 and the adjusting nut 50'. The spring is held under predetermined compression by an adjusting nut 54 which is threaded on the exterior of the upper end portion of sleeve 46 and which bears against the upper side of the nut 50'. Adjustment of the nut 54 independently varies the force with which the knife blade 41 is urged toward the blades of the reel without in any way affecting the limiting position established by the surfaces 50, 51. Likewise, rotative adjustment of the sleeve 46 varies this limiting position without in any way affecting the degree of compression of the spring 52 or the force with which the knife blade 41 is urged against the blades of the reel. With this adjusting apparatus the cutting edges of the knife blade 41 and the reel blades 32 can be protected from injury due to the engagement of stones or other hard objects therebetween by permitting the knife blade to yield away from the reel without in any way interfering with the normal setting of the knife blade as established by adjustment of the nut 50'.

Although but one embodiment of the invention is herein shown and described, it will be understood that various changes including the size, shape and arrangement of parts may be made without departing from the spirit of the invention, and it is not my intention to limit the scope thereof other than by the terms of the appended claim.

I claim:

In a lawn mower; a cutting unit including a frame structure, a cutting reel journaled on said frame structure, a knife bed shiftably mounted on said frame structure having a knife thereon disposed in operative relationship with respect to said reel, a threaded stem attached to said knife bed, a sleeve threaded on said stem having a laterally extending flange and having external threads on its periphery, an abutment on said structure engageable with said flange for positively limiting movement of said knife in a direction toward said reel, an adjusting member extending laterally of and axially shiftably mounted on said sleeve, said adjusting member being fixed against rotation relative to said sleeve and adapted to screw the latter axially of said stem for varying the position of the flange of said sleeve and the limiting position of said knife, a spring bearing between said abutment and the adjacent side of said adjusting member for yieldably opposing movement of said knife away from said reel, and a nut member threaded on said external threads of said sleeve and engaging the opposite side of said shiftable adjustable member for compressing the latter and predetermining the force with which said spring opposes movement of said knife away from said reel independently of the position of said flange.

HIRAM F. GODWIN.